(12) United States Patent
Ellul et al.

(10) Patent No.: US 8,809,455 B2
(45) Date of Patent: Aug. 19, 2014

(54) ELASTOMERIC COMPOSITIONS AND THEIR USE IN ARTICLES

(75) Inventors: Maria D. Ellul, Silver Lake, OH (US); Anthony Jay Dias, Houston, TX (US); Rodney May, Wadsworth, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 206 days.

(21) Appl. No.: 12/548,797

(22) Filed: Aug. 27, 2009

(65) Prior Publication Data
US 2011/0054093 A1 Mar. 3, 2011

(51) Int. Cl.
| | | |
|---|---|---|
| *C08L 29/04* | (2006.01) | |
| *C08L 55/02* | (2006.01) | |
| *C08L 67/00* | (2006.01) | |
| *C08L 77/00* | (2006.01) | |
| *C08L 79/00* | (2006.01) | |
| *C08L 81/04* | (2006.01) | |
| *C08L 81/06* | (2006.01) | |
| *C08L 23/22* | (2006.01) | |
| *C08L 23/28* | (2006.01) | |
| *C08L 23/02* | (2006.01) | |
| *B60C 1/00* | (2006.01) | |
| *C08L 79/08* | (2006.01) | |

(52) U.S. Cl.
CPC .............. *C08L 23/283* (2013.01); *C08L 79/08* (2013.01); *C08L 23/22* (2013.01); *C08L 77/00* (2013.01); *C08L 23/02* (2013.01); *B60C 1/00* (2013.01)
USPC .................. 525/58; 525/60; 525/64; 525/65; 525/66; 525/67; 525/68; 525/71; 525/133; 525/166; 525/179; 525/187; 525/189

(58) Field of Classification Search
CPC .................... C08L 23/22; C08L 35/00–35/08; C08L 51/00–51/10; C08L 77/00; C08L 2205/08; C08L 2312/00; C08L 2666/24
USPC ......... 525/58, 60, 64, 65, 66, 67, 68, 71, 133, 525/166, 179, 187, 189, 191
See application file for complete search history.

(56) References Cited

U.S. PATENT DOCUMENTS

| | | | |
|---|---|---|---|
| 2006/0235153 A1 | 10/2006 | Soeda et al. | |
| 2006/0235156 A1 | 10/2006 | Griswold et al. | |
| 2008/0275187 A1 | 11/2008 | Tsou et al. | |
| 2008/0314493 A1* | 12/2008 | Hara | 152/510 |
| 2010/0331452 A1* | 12/2010 | Tsou et al. | 523/351 |

FOREIGN PATENT DOCUMENTS

| | | | |
|---|---|---|---|
| EP | 0 722 850 | | 5/1999 |
| EP | 0 969 039 | | 1/2000 |
| EP | 1 995 275 | | 11/2008 |
| WO | WO2007/070063 | | 6/2007 |
| WO | WO 2007/100157 | * | 9/2007 |
| WO | WO 2009/048472 | * | 4/2009 |
| WO | WO2009/048472 | | 4/2009 |

OTHER PUBLICATIONS

Jiri George Drobny, *Handbook of Thermoplastic Elastomers*, William Andrew Inc., New York, p. 23 and pp. 179-190, 2007.
Brendan Rodgers ed., *Rubber Compounding Chemistry and Applications*, CRC Press LLC, p. 365 and pp. 394-399, 2004.

* cited by examiner

*Primary Examiner* — Ana Woodward
(74) *Attorney, Agent, or Firm* — Nancy T. Krawczyk

(57) ABSTRACT

A dynamically vulcanized alloy contains at least one isobutylene-containing elastomer and at least one thermoplastic resin, wherein the elastomer is present as a dispersed phase of small vulcanized or partially vulcanized particles in a continuous phase of the thermoplastic resin. The dynamically vulcanized alloy also contains an anhydride functionalized oligomer. The alloy maintains a high Shore A hardness value while obtaining improved flowability for processing.

17 Claims, No Drawings

ELASTOMERIC COMPOSITIONS AND THEIR USE IN ARTICLES

FIELD OF THE INVENTION

The present invention relates to thermoplastic elastomeric compositions. More particularly, the present invention is directed to a thermoplastic elastomeric composition comprising compounds that act as both an extender and reactive plasticizer for the thermoplastic in the composition.

BACKGROUND

The present invention is related to thermoplastic elastomeric compositions particularly useful for tire and other industrial rubber applications, reinforced or otherwise, that require impermeability characteristics.

EP 0 722 850 B1 discloses a low-permeability thermoplastic elastomeric composition that is excellent as an innerliner in pneumatic tires. This composition comprises a low permeability thermoplastic in which is dispersed a low permeability rubber. EP 0 969 039 A1 discloses a similar composition and teaches that the small particle size rubber dispersed in the thermoplastic was important to achieve acceptable durability of the resulting composition.

There are also examples of the use of a thermoplastic elastomer composed of a rubber and a thermoplastic for use as an innerliner in a tire. But, in general, a flexible material of the type disclosed therein has low heat resistance. When the thermoplastic material in the composition has a melting point less than the tire vulcanization temperature, when the tire curing bladder is released at the end of the curing cycle, the inside surface of the tire may have defects due to the thermoplastic material of the composition sticking to rubber of the curing bladder.

Controlling the viscosity difference between the two different materials in the composition is also considered important, as the viscosity difference affects the dispersed rubber particle size. However, when seeking to maintain a ratio of melt viscosities of the rubber/plastic at 1.0 (one), the rubber may dominate the matrix and the composition no longer exhibits a desired thermoplasticity, see EP 0 969 039 A1.

SUMMARY OF THE INVENTION

The present invention is directed to a thermoplastic elastomeric composition having improved characteristics over previously known similar compositions.

The present invention is directed to a dynamically vulcanized alloy containing at least one isobutylene-containing elastomer and at least one thermoplastic resin, wherein the elastomer is present as a dispersed phase of small vulcanized or partially vulcanized particles in a continuous phase of the thermoplastic resin. The dynamically vulcanized alloy also contains therein an anhydride functionalized oligomer.

In another aspect of the disclosed invention, the oligomer of the anhydride functionalized oligomer, prior to functionalization, has a molecular weight in the range of 500 to 5000. In another aspect of the invention, the oligomer has a molecular weight in the range of 750 to 2500.

In one aspect of the disclosed invention, the oligomer is an alkyl, an aryl, or an alkenyl oligomer and the anhydride is either a maleic or a succinic anhydride. In another aspect of the invention, the succinic anhydride functionalized polymer is a poly-n-alkyl succinic anhydride or a poly-iso-alkyl succinic anhydride.

In another aspect of the invention, the functionalized oligomer is selected from the group consisting of poly-isobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, polyhexenyl succinic anhydride, poly-dodecenyl succinic anhydride.

In another aspect of the invention, the alloy contains 2 to 35 phr of the succinic anhydride functionalized polymer, based on the amount of the isobutylene-containing elastomer in the alloy.

In another aspect of the invention, the alloy further includes a plasticizer. The plasticizer may be a polyamide, tertiary amine, secondary diamine, ester, or sulfonamide. Preferably, the ratio of succinic anhydride functionalized oligomer to plasticizer is in the range of 0.15 to 3.0.

In another aspect of the invention, the alloy is substantially free of any acrylates and preferably, the alloy is devoid of any acrylates.

In another aspect of the invention, the isobutylene containing elastomer is a halogenated butyl rubber. In another aspect of the invention, the isobutylene containing elastomer is a random copolymer of isobutylene and an alkylstyrene. Preferably, when the elastomer is the random copolymer of isobutylene and an alkylstyrene, the alkylstyrene is paramethylstyrene. In any embodiment, the elastomer may be halogenated with bromine or chlorine.

In another aspect of the invention, the isobutylene containing elastomer is present in the alloy in an amount in the range of 2 to 90 weight percent.

In another aspect of the invention, the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetate, ethylene vinyl alcohol, and mixtures thereof.

In another aspect of the invention, the alloy has a Shore A hardness of at least 70.

DETAILED DESCRIPTION OF THE INVENTION

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

DEFINITIONS

Definitions applicable to the presently described invention are as described below.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e. a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Rubber refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent . . . ". Rubbers are often also referred to as elastomers; the term elastomer may be used herein interchangeably with the term rubber.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

Isoolefin refers to any olefin monomer having at least one carbon having two substitutions on that carbon. Multiolefin refers to any monomer having two or more double bonds. In a preferred embodiment, the multiolefin is any monomer comprising two conjugated double bonds such as a conjugated diene like isoprene.

Isobutylene based elastomer or polymer refers to elastomers or polymers comprising at least 70 mol % repeat units from isobutylene.

Elastomer

Useful elastomeric compositions for this invention comprise a mixture of monomers, the mixture having at least (1) a $C_4$ to $C_7$ isoolefin monomer component with (2) a multiolefin, monomer component. The isoolefin is present in a range from 70 to 99.5 wt % by weight of the total monomers in one embodiment, and 85 to 99.5 wt % in another embodiment. The multiolefin component is present in amounts in the range of from 30 to about 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers.

Preferred elastomers useful in the practice of this invention include isobutylene-based copolymers. As stated above, an isobutylene based elastomer or a polymer refers to an elastomer or a polymer comprising at least 70 mol % repeat units from isobutylene and at least one other polymerizable unit. The isobutylene-based copolymer may or may not be halogenated.

In one embodiment of the invention, the elastomer is a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer.

One embodiment of the butyl rubber polymer of the invention is obtained by reacting 95 to 99.5 wt % of isobutylene with 0.5 to 8 wt % isoprene, or from 0.5 wt % to 5.0 wt % isoprene in yet another embodiment.

Elastomeric compositions of the present invention may also comprise at least one random copolymer comprising a $C_4$ to $C_7$ isomonoolefins, such as isobutylene, and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of a $C_4$ to $C_6$ α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

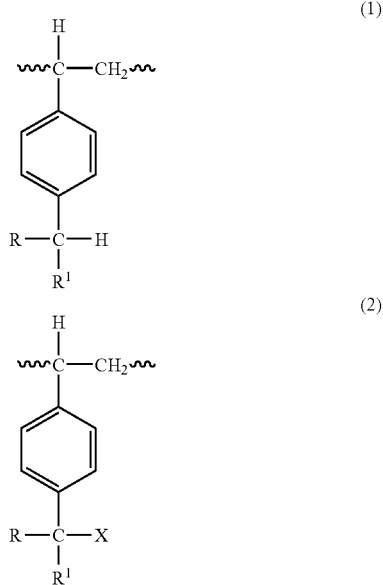

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in one embodiment, and in another embodiment from 0.1 to 5 mol %. In yet another embodiment, the amount of functionalized structure (2) is from 0.2 to 3 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

In an embodiment, the elastomer comprises random polymers of isobutylene and 0.5 to 20 mol % para-methylstyrene wherein up to 60 mol % of the methyl substituent groups present on the benzyl ring is functionalized with a halogen such a bromine or chlorine (para-(bromomethylstyrene)), an acid, or an ester.

In another embodiment, the functionality is selected such that it can react or form polar bonds with functional groups present in the matrix polymer, for example, acid, amino or hydroxyl functional groups, when the polymer components are mixed at high temperatures.

In one embodiment, brominated poly(isobutylene-co-p-methylstyrene) "BIMSM" polymers generally contain from 0.1 to 5 mol % of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 mol % in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

Thermoplastic Resin

For purposes of the present invention, a thermoplastic (alternatively referred to as thermoplastic resin) is a thermoplastic polymer, copolymer, or mixture thereof having a Young's modulus of more than 200 MPa at 23° C. The resin should have a melting temperature of about 170° C. to about 260° C., preferably less than 260° C., and most preferably less than about 240° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with an aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene $C_{2-6}$ alkane dicarboxylates such as poly(trans-1,4-cyclohexylene succinate) and poly(trans-1,4-cyclohexylene adipate); poly (cis or trans-1,4-cyclohexanedimethylene)alkanedicarboxylates such as poly (cis-1,4-cyclohexanedimethylene)oxlate and poly-(cis-1,4-cyclohexanedimethylene)succinate, poly($C_{2-4}$ alkylene terephthalates) such as polyethyleneterephthalate and poly-tetramethylene-terephthalate, poly($C_{2-4}$ alkylene isophthalates) such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

Ethylene copolymer resins useful in the invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g. acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

Thermoplastic Elastomeric Composition

At least one of any of the above elastomers and at least one of any of the above thermoplastics are blended to form a dynamically vulcanized alloy. The term "dynamic vulcanization" is used herein to connote a vulcanization process in which the vulcanizable elastomer is vulcanized in the presence of a thermoplastic under conditions of high shear and elevated temperature. As a result, the vulcanizable elastomer is simultaneously crosslinked and preferably becomes dispersed as fine sub micron size particles of a "micro gel" within the thermoplastic. The resulting material is often referred to as a dynamically vulcanized alloy ("DVA").

Dynamic vulcanization is effected by mixing the ingredients at a temperature which is at or above the curing temperature of the elastomer, and also above the melt temperature of the thermoplastic component, in equipment such as roll mills, Banbury™ mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional thermoplastic processing techniques such as extrusion, injection molding, compression molding, etc. Scrap or flashing can also be salvaged and reprocessed; those skilled in the art will appreciate that conventional elastomeric thermoset scrap, comprising only elastomer polymers, cannot readily be reprocessed due to the cross-linking characteristics of the vulcanized polymer.

Preferably the thermoplastic may be present in an amount ranging from about 10 to 98 wt %, preferably from about 20 to 95 wt %, the elastomer may be present in an amount ranging from about 2 to 90 wt %, preferably from about 5 to 80 wt %, based on the polymer blend.

The elastomer may be present in the composition in a range from up to 90 wt % in one embodiment, from up to 50 wt % in another embodiment, from up to 40 wt % in another embodiment, and from up to 30 wt % in yet another embodiment. In yet another embodiment, the elastomer may be present from at least 2 wt %, and from at least 5 wt % in another embodiment, and from at least 5 wt % in yet another embodiment, and from at least 10 wt % in yet another embodiment. A desirable embodiment may include any combination of any upper wt % limit and any lower wt % limit.

In preparing the DVA, other materials may be blended with either the elastomer or the thermoplastic, before the elastomer and the thermoplastic are combined in the blender, or added to the mixer during or after the thermoplastic and elastomer have already been introduced to each other. These other materials may be added to assist with preparation of the DVA or to provide desired physical properties to the DVA. Such additional materials include, but are not limited to, curatives, compatibilizers, extenders, and plasticizers.

With reference to the elastomers of the disclosed invention, "vulcanized" or "cured" refers to the chemical reaction that forms bonds or cross-links between the polymer chains of the elastomer. Curing of the elastomer is generally accomplished by the incorporation of the curing agents and/or accelerators, with the overall mixture of such agents referred to as the cure system or cure package.

Suitable curing components include sulfur, metal oxides, organometallic compounds, radical initiators. Common curatives include ZnO, CaO, MgO, Al2O3, CrO3, FeO, Fe2O3, and NiO. These metal oxides can be used in conjunction with metal stearate complexes (e.g., the stearate salts of Zn, Ca, Mg, and Al), or with stearic acid or other organic acids and either a sulfur compound or an alkyl or aryl peroxide compound or diazo free radical initiators. If peroxides are used, peroxide co-agent commonly used in the art may be employed. The use of peroxide curative may be avoided if the thermoplastic resin is one such that the presence of peroxide would cause the thermoplastic resin to cross-link.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In one embodiment of the invention, at least one curing agent, preferably zinc oxide, is typically present at about 0.1 to about 15 phr; alternatively at about 0.5 to about 10 phr, or at about 1.0 to 2.0 phr.

In an embodiment of the DVA, due to the goal of the elastomer being present as discrete particles in a thermoplastic domain, the addition of the curing components and the temperature profile of the components are adjusted to ensure the correct morphology is developed. Thus, if there are multiple mixing stages in the preparation of the DVA, the curatives may be added during an earlier stage wherein the elastomer alone is being prepared. Alternatively, the curatives may be added just before the elastomer and thermoplastic resin are combined or even after the thermoplastic has melted and been mixed with the rubber. Although discrete rubber particle morphology in a continuous thermoplastic matrix is the preferred morphology, the invention is not limited to only this morphology and may also include morphologies where both the elastomer and the thermoplastic are continuous. Sub-inclusions of the thermoplastic inside the rubber particles may also be present.

Compatibilizers may be employed due to the difference in solubility of the thermoplastic resins and elastomers in the DVA. Such compatibilizers are thought to function by modifying, and in particular reducing, the surface tension between the rubber and thermoplastic components of the composition. Suitable compatibilizers include ethylenically unsaturated nitrile-conjugated diene-based high saturation copolymer rubbers (HNBR), epoxylated natural rubbers (ENR), acrylate rubber, and mixtures thereof, as well as copolymers having the same structure of the thermoplastic resin or the elastomeric polymer, or a structure of a copolymer having an epoxy group, carbonyl group, halogen group, amine group, maleated group, oxazoline group, or hydroxyl group capable of reacting with the thermoplastic resin or the elastomer.

The amount of compatibilizer is typically about 0.5 to about 10 parts by weight; preferably about 3 to about 8 parts by weight, based upon 100 parts by weight of the total of the elastomer.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a DVA with acceptable elastomeric dispersion sizes.

Components previously used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines. Examples include maleic anhydride-grafted ethylene-ethyl acrylate copolymers (a solid rubbery material available from Mitsui-DuPont as AR-201 having a melt flow rate of 7 g/10 min measured per JIS K6710) and n-butyl benzene sulfonamide (BBSA). These compounds may act to increase the 'effective' amount of thermoplastic material in the elastomeric/thermoplastic compound. The amount of additive is selected to achieve the desired viscosity comparison without negatively affecting the characteristics of the DVA. If too much is present, impermeability may be decreased and the excess may have to be removed during post-processing. If not enough compatibilizer is present, the elastomer may not invert phases to become the dispersed phase in the thermoplastic resin matrix.

In the present invention, the limitations of known compatibilizers are reduced by, among other things, employing anhydride grated oligomers as a plasticizer or viscosity modifier for the DVA in place of conventional compatibilizers or plasticizers. Anhydride moieties, both maleic and succinic anhydride moities, have an affinity and compatibility with the thermoplastics employed in the compositions of this invention. The anhydrides are miscible or sufficiently compatible with the thermoplastic, and, not wishing to be bound by any theory, it is believed that the anhydrides may also act as scavengers for any terminal amines in the thermoplastic, causing the succinic anhydride to graft to the thermoplastic and reduce the use of other plasticizers and compatibilizers. As a result of the grafting reaction, the anhydride functionalized oligomer is fixed within the DVA, and does not volatize out like conventional plasticizers/compatibilizers during post DVA processing operations such as film blowing or tire curing. Thus, the resulting DVA has a low volatile organic compound emissions. This is believed to be most applicable when using polar thermoplastics. Furthermore, it was surprisingly found that the melting point of a polyamide thermoplastic phase is invariant when the anhydrides are used, contrary to traditional plasticizers for polyamide thermoplastics such as n-butyl benzene sulfonamides that negatively depress the melting point of the thermoplastic.

Both maleic and succinic anhydrides (both aromatic anhydrides) are useful in the present invention. Preferred anhydrides are substituted succinic anhydrides, wherein the substitution can be an alkyl, aryl, or alkenyl. The substituted succinic anhydride may be prepared by thermal or chloro methods known in the art of reacting an alkyl, aryl, or olefin with maleic anhydride. The oligomer, including copolymers of lower olefins, being reacted with the maleic or succinic anhydride, has a molecular weight in the range of about 500 to 5000, alternatively 750 to 2500, or alternatively 500 to 1500. The oligomer may also have a molecular weight in the ranges of 1000 to 5000, 800 to 2500, or 750 to 1250. Specific examples of substituted succinic anhydrides include polyisobutylene succinic anhydride, n-octenyl succinic anhydride, n-hexenyl succinic anhydride, and dodocenyl succinic anhydride.

The most preferred anhydride functionalized oligomers for this invention are those derived from polyisobutene and are commonly known as polyisobutylene succinic anhydride or polyisobutene succinic anhydride (PIBSA). The PIBSA may be made by cationic polymerization of isobutene with boron trifluoride as catalyst. In the course of the polymerization, high concentrations of $\alpha$-olefins are formed during the transfer reaction and as a result the polymerization product has a high proportion of terminal double bonds ($\alpha$-olefin). They are normally clear to amber viscous liquids and are specially optimized during the post polymerization maleitation reaction to have a low bismaleination. The anhydride level of the PIBSA can vary and a preferred range is a few percent up to about 30 wt % with a preferred range of 5 to 25 wt % and a more preferred range of 7 to 17 wt % and a most preferred range of 9 to 15 wt %.

Succinic anhydrides functionalized oligomers are present in the DVA in amounts ranging from a minimum amount of about 2 phr, 5 phr, or 10 phr to a maximum amount of 15 phr, 20 phr, 25 phr, 30 phr, or 35 phr. The range of succinic anhydride oligomer may range from any of the above stated minimums to any of the above stated maximums, and the amount of succinic anhydride functionalized oligomer may fall within any of the ranges.

The succinic anhydride functionalized oligomer may also replace a portion of the plasticizers, such as butyl benzene sulfonamide or other sulfonamides, which are commonly used in a polyamide-based DVA compound. When the succinic anhydride functionalized oligomer replaces a portion of the plasticizer, the total amount of replacement is not more than the original amount of plasticizer needed to formulate the DVA. The total amount of succinic anhydride functionalized oligomer and plasticizer is also within the above stated ranges of a minimum amount of about 2 phr, 5 phr, or 10 phr to a maximum amount of 15 phr, 20 phr, 25 phr, 30 phr, or 35 phr.

In a preferred embodiment, the succinic anhydride functionalized oligomer and plasticizer are present in the DVA in a ratio ranging from 0.15 to 3.0. In another embodiment, the ratio is in the range of 0.15 to 1.50. In another embodiment, the ratio of polyisobutylene succinic anhydride to plasticizer is approximately 0.30 to 1.50.

In another preferred embodiment, the DVA is substantially free of any acrylates. By substantially free, the DVA contains less than 0.5 phr of any acrylate or is preferably devoid of acrylate.

The invention, accordingly, provides the following embodiments:

A. A dynamically vulcanized alloy comprising at least one isobutylene-containing elastomer; at least one thermoplastic resin, and an anhydride functionalized oligomer, wherein the elastomer is present as a dispersed phase of small highly vulcanized or partially vulcanized particles in a continuous phase of the thermoplastic resin;

B. The alloy of embodiment A, wherein the oligomer is selected from the group consisting of an alkyl, an aryl, and an alkenyl oligomer.

C. The alloy of embodiment A or B, wherein the oligomer has a molecular weight in the range of 500 to 5000.

D. The alloy of any preceding embodiment A to C, wherein the anhydride functionality in the oligomer is either succinic anhydride or maleic anhydride.

E. The alloy of any preceding embodiment A to D, wherein the anhydride functionalized oligomer is a poly-n-alkyl succinic anhydride or a poly-iso-alkyl succinic anhydride.

F. The alloy of any preceding embodiment A to E, wherein the functionalized oligomer is selected from the group consisting of poly-isobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, poly-hexenyl succinic anhydride, and poly-dodecenyl succinic anhydride.

G. The alloy of any preceding embodiment A to F, wherein the alloy comprises 2 to 35 phr of the anhydride functionalized oligomer, based on the amount of the isobutylene-containing elastomer in the alloy.

H. The alloy of any preceding embodiment A to G, wherein the alloy further comprises a plasticizer, the plasticizer being selected from the group consisting of polyamides, tertiary amines, secondary diamines, esters, and sulfonamides.

I. The alloy of any preceding embodiment A to H, wherein the alloy is substantially free of any acrylates.

J. The alloy of any preceding embodiment A to I, wherein said elastomer is a halogenated butyl rubber.

K. The alloy of any preceding embodiment A to J, wherein said elastomer is a copolymer of isobutylene and an alkylstyrene.

L. The alloy of any preceding embodiment A to K, wherein said elastomer is a copolymer of isobutylene and paramethylstyrene, and is optionally halogenated.

M. The alloy of any preceding embodiment A to L, wherein the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, ethylene vinyl alcohols, and mixtures thereof.

N. The alloy of any preceding embodiment A to M, wherein the elastomer is present in the alloy in an amount in the range of 2 to 90 weight percent.

EXAMPLES

Test methods are summarized in Table 1.

When possible, standard ASTM tests were used to determine the DVA physical properties (see Table 1). Stress/strain properties (tensile strength, elongation at break, modulus values, energy to break) were measured at room temperature using an Instron™ 4204. Tensile measurements were done at ambient temperature on specimens (dog-bone shaped) width of 0.16 inches (0.41 cm) and a length of 0.75 inches (1.91 cm) length (between two tabs) were used. The thickness of the specimens varied and was measured manually by A Mahr Federal Inc. thickness guage. The specimens were pulled at a crosshead speed of 20 inches/min. (51 cm/min.) and the stress/strain data was recorded. The average stress/strain value of at least three specimens is reported. Shore A hardness was measured at room temperature by using a Zwick Durometer after 15 seconds indentation. LCR viscosity was measured with a Dynisco™ capillary rheometer at 30/1 L/D (length/diameter) at 220° C. at 1200 l/s. The melting point was measured by differential scanning calorimetry at 10°/minute.

TABLE 1

| Parameter | Units | Test |
|---|---|---|
| Physical Properties, press cured, 2 mm thickness sheets, 5 minutes @ 207° C. | | |
| Hardness | Shore A | ASTM D2240 |
| Modulus 10%, 50%, 100% | MPa | ASTM D412 |
| Tensile Strength | MPa | ASTM D412 |
| Elongation at Break | % | ASTM D412 |
| LCR Viscosity | Pa s | 30/1 L/D at 220° C. at 1200 1/s |
| Melting Point | ° C. | Differential Scanning Calorimetry at 10° C./minute |

Samples were prepared of both comparative DVAs, A and B of Table 3, and exemplary DVAs made in accordance with the present invention. The components used in the samples are identified in Table 2 below. The PIBSA form for the practice of this invention is not restricted to the examples used and other commercial offerings which are diluted in oil may also be employed, especially if the molecular weight of the starting PIBSA renders it too viscous. The PIBSAs may also be heated so they can be easily dispensed in mixing equipment and also to facilitate their incorporation and mixing.

TABLE 2

| Component | Brief Description | Commercial Source |
|---|---|---|
| BIMSM | Brominated para-methylstyrene-isobutylene copolymer, 0.75 mol % benzylic bromine, 2.5 mole % p-methylstyrene (prior to bromination), MW = 450,000 g/mole, Mn = 184,000 g/mole, Mooney viscosity, ML (1 + 8) 125° C. = 45, | |
| Polyamide copolymer | Nylon 6/66 random copolymer; $MW_n$ = 40,000 g/mole, Ube 5033B random copolymer, 85 wt % nylon 6 and 15 wt % nylon 6, 6 | UBE 5033B, from UBE Chemical |
| Compatibilizer | Maleated ethylene ethyl acrylate copolymer (mEEA) | AR-2001, from Mitsui-DuPont Co., Ltd. |
| PIBSA 1 | Polyisobutylene succinic anhydride, MW before anhydride reaction = 950, viscosity at 100° C. = 459 cSt, saponification # = 100 mg KOH/gm | PIBSA 950 (TPC950 ™), from Texas Petrochemicals |
| PIBSA 2 | Polyisobutylene succinic anhydride, MW before anhydride reaction = 1,000, viscosity at 100° C. = 480 cSt, saponification # + 87 mg KOH/gm | Glissopal ™ SA from BASF |
| Plasticizer | n-butylbenzene sulfonamide | Uniplex ™ 214, Uniplex Chemical |

Except for comparative sample A, the amount of elastomer, polyamide, stabilizer blend, and curatives were identical for all compositions. The stabilizer blend was present in the amount of 0.48 phr, and the curatives for each DVA consisted of 0.15 phr zinc oxide, 0.30 phr zinc stearate, and 0.65 stearic acid for a total additive amount of 1.58 phr. For comparative sample A, only the amount of elastomer was greater, to obtain the same phr as comparative sample B. For each example identified below, the DVA was prepared in the same manner, using a 85 cm³ Brabender™ mixer. Both comparative and exemplary DVA samples were tested to determine the physical characteristics. The compositions and test results are set forth below in Table 3.

When the full amount of compatibilizer, the mEEA, is replaced with the polyisobutylene succinic anhydride and the amount of plasticizer is not modified, the strength characteristics of the DVA, the shore A hardness and ultimate tensile strength, are improved. The elastic nature of the DVA is also improved, showing an increase in the 10% modulus and maximum strain. The viscosity values of the material, as measured by the LCR values, is not significantly impacted at 5 phr PIBSA whereas at 10 phr PIBSA the viscosity is significantly reduced. For these DVAs, lower viscosity means more fluidity which is a positive characteristic since shaping operations to make film or parts are improved due to the improved flow of the material.

by one-half fractionally reduces the hardness properties of the DVA, improves the 10% modulus values, and only negatively impacts the maximum strain of the DVA. Data from further reduction of the plasticizer shows that an almost complete removal of the plasticizer negatively impacts the elastic nature of the DVA. The melt viscosity of the inventive samples is reduced relative to the comparative samples, which is an improved and sought after trait for processability and fabricability, or drapeability, of the product during shaping operations such as extrusion or film blowing.

TABLE 3

|  | A | B | 1 | 2 | 3 | 4 | 5 |
|---|---|---|---|---|---|---|---|
| BIMSM | 110.05 | 100.0 | 100.0 | 100.0 | 100.0 | 100.0 | 100.0 |
| Talc | 2.0 | 2.0 | 2.0 | 2.0 | 2.0 | 2.0 | 2.0 |
| Polyamide copolymer | 62.96 | 62.96 | 62.96 | 62.96 | 62.96 | 62.96 | 62.96 |
| Compatibilizer | — | 10.05 | — | — | — | — | — |
| PIBSA 1 | — | — | 10.05 | 5.03 | 5.03 | 5.03 | 5.03 |
| Plasticizer | 26.99 | 26.99 | 26.69 | 26.69 | 13.49 | 6.74 | 3.37 |
| Additives | 1.58 | 1.58 | 1.58 | 1.58 | 1.58 | 1.58 | 1.58 |
| Total PHR | 203.58 | 203.58 | 203.58 | 198.26 | 185.06 | 178.31 | 174.94 |
| phr of PIBSA and plasticizer |  |  | 36.74 | 32.02 | 18.52 | 11.77 | 8.4 |
| Ratio of PIBSA to plasticizer |  |  | 0.38 | 0.188 | 0.373 | 0.746 | 1.49 |
| Test Results |  |  |  |  |  |  |  |
| Shore A Hardness, at 15 s | 80 | 77 | 82 | 85 | 79 | 78 | 72 |
| ultimate tensile strength, MPa | 7.29 | 6.76 | 8.17 | 10.5 | 6.95 | 6.08 | 5.58 |
| 10% modulus, MPa | 2.95 | 2.37 | 3.53 | 4.14 | 3.13 | 2.73 | 2.18 |
| Maximum Strain, % | 89 | 98 | 128 | 114 | 80 | 93 | 142 |
| LCR Viscosity (Pa-s) @ 1200 (1/s) @220° C., (L/D 30/1) | 391 | 334 | 235 | 326 | 316 | 298 | 281 |
| Melting Point, ° C. | — | 182 | 188 | 184 | 192 | 193 | 194 |

With obtaining improved properties to desirable characteristics of the DVA, the inventors explored the reduction in the plasticizer. As seen in example 3, reduction of the plasticizer A second PIBSA, having a 1,000 molecular weight olefin prior to the anhydride reaction, was also tested, with the composition and results shown in Table 4.

TABLE 4

|  | 6 | 7 | 8 | 9 | 10 | 11 | 12 | 13 |
|---|---|---|---|---|---|---|---|---|
| BIMSM | 100.0 | 100.0 | 100.0 | 100.0 | 100.0 | 100.0 | 100.0 | 100.0 |
| Talc | 2.0 | 2.0 | 2.0 | 2.0 | 2.0 | 2.0 | 2.0 | 2.0 |
| Polyamide copolymer | 62.96 | 62.96 | 62.96 | 62.96 | 62.96 | 62.96 | 62.96 | 62.96 |
| Compatibilizer | — | — | — | — | — | — | — | — |
| PIBSA 2 | 5.03 | 5.03 | 5.03 | 5.03 | 10.05 | 10.05 | 10.05 | 10.05 |
| Plasticizer | 26.69 | 13.49 | 6.74 | 3.37 | 26.69 | 13.49 | 6.75 | 3.37 |
| Additives | 1.58 | 1.58 | 1.58 | 1.58 | 1.58 | 1.58 | 1.58 | 1.58 |
| Total PHR | 198.26 | 185.06 | 178.31 | 174.94 | 203.58 | 190.08 | 183.34 | 179.96 |
| phr of PIBSA and plasticizer | 32.02 | 18.52 | 11.77 | 8.4 | 36.74 | 23.54 | 16.8 | 13.42 |
| Ratio of PIBSA to plasticizer | 0.188 | 0.373 | 0.746 | 1.49 | 0.376 | 0.745 | 1.48 | 2.98 |
| Test Results |  |  |  |  |  |  |  |  |
| Shore A Hardness, at 15 s | 83 | 78 | 76 | 76 | 81 | 78 | 78 | 75 |
| ultimate tensile strength, MPa | 7.89 | 7.12 | 6.22 | 5.38 | 8.81 | 6.54 | 5.49 | 5.36 |
| 10% modulus, MPa | 3.5 | 3.37 | 2.96 | 2.52 | 3.31 | 2.94 | 3.08 | 2.43 |

TABLE 4-continued

|  | 6 | 7 | 8 | 9 | 10 | 11 | 12 | 13 |
|---|---|---|---|---|---|---|---|---|
| Maximum Strain, % | 100 | 84 | 86 | 95 | 144 | 137 | 71 | 96 |
| LCR Viscosity (Pa-s) @ 1200 (1/s) @220° C., (L/D 30/1) | 330 | 303 | 310 | 288 | 264 | 269 | 265 | 266 |
| Melting Point, ° C. | 184 | 189 | 189 | 193 | 190 | 190 | 195 | 196 |

In comparison to comparative DVA B, the DVA of example 6 shows improved solid state strength properties of shore A and ultimate tensile strength and improved elastic properties with a small decrease in viscosity. The decrease in viscosity is beneficial since this indicated improved fluidity of the material in the melt.

Similar to PIBSA1, the use of PIBSA2 also enabled a significant reduction in the amount of plasticizer without a comprising in the material properties.

To analyze the limits of reduction in the plasticizer and inclusion of the oligomeric polyisobutylene succinic anhydride, further examples 10 to 13 were prepared. Exemplary DVAs with comparable ratios of PIBSA to plasticizer were compared. The Shore A hardness and ultimate tensile strength properties are similar, with decreases in LCR viscosities for the higher amount of PIBSA; again, a desired characteristic in the DVA.

With a further decrease in the plasticizer, significantly increasing the ratio of PIBSA to plasticizer, the 10% modulus is further decreased, suggesting a limit for the reduction of plasticizer is being approached.

In the DVA, by substituting the succinic anhydride polymer in the alloy, the solid state strength properties are maintained while improved is the desired fluidity of the DVA as measured by the various reductions in LCR viscosity. Also desired is a Shore A hardness of at least 70, and most preferably at least 75.

The inventive compositions can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide and especially polyamide 12 as one of the component layers. Other useful goods that can be made using compositions of the invention include air spring bladders, seals, molded goods, cable housing, and other articles disclosed in THE VANDERBILT RUBBER HANDBOOK, P 637-772 (Ohm, ed., R. T. Vanderbilt Company, Inc. 1990).

What is claimed is:

1. A dynamically vulcanized alloy comprising the four following components:
   a) at least one isobutylene-containing elastomer;
   b) at least one polar thermoplastic resin,
   c) an anhydride functionalized oligomer, wherein the oligomer, prior to functionalization, has a molecular weight in the range of 750 to 1250, and
   d) a plasticizer, the plasticizer comprising a component selected from the group consisting of tertiary amines, secondary diamines, and sulfonamides,
wherein the anhydride functionalized oligomer and the plasticizer are present in the alloy in a ratio ranging from 0.3 to 1.5, and
wherein the anhydride functionality of the oligomer is grafted to the polar thermoplastic resin and the elastomer is present as a dispersed phase of small vulcanized or partially vulcanized particles in a continuous phase of the thermoplastic resin.

2. The alloy of claim 1, wherein the oligomer is selected from the group consisting of an alkyl, an aryl, and an alkenyl oligomer.

3. The alloy of claim 1, wherein the anhydride functionality is either a succinic anhydride or a maleic anhydride.

4. The alloy of claim 1, wherein the anhydride functionalized oligomer is a poly-n-alkyl succinic anhydride or a poly-iso-alkyl succinic anhydride.

5. The alloy of claim 1, wherein the functionalized oligomer is selected from the group consisting of poly-isobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, poly-hexenyl succinic anhydride, and poly-dodecenyl succinic anhydride.

6. The alloy of claim 1, wherein the alloy comprises 2 to 35 phr of the anhydride functionalized oligomer, based on the amount of the isobutylene-containing elastomer in the alloy.

7. The alloy of claim 1, wherein the alloy is substantially free of any acrylates.

8. The alloy of claim 1, wherein said elastomer is a halogenated butyl rubber.

9. The alloy of claim 1, wherein said elastomer is a copolymer of isobutylene and an alkylstyrene.

10. The alloy of claim 1, wherein said elastomer is a copolymer of isobutylene and paramethylstyrene, and is optionally halogenated.

11. The alloy of claim 1, wherein the thermoplastic resin is selected from the group consisting of polyamides, polyimides, polycarbonates, polyesters, polysulfones, polylactones, acrylonitrile-butadiene-styrene resins, polyphenylene sulfide, styrene-acrylonitrile resins, styrene maleic anhydride resins, aromatic polyketones, ethylene vinyl acetates, ethylene vinyl alcohols, and mixtures thereof.

12. The alloy of claim 1, wherein the elastomer is present in the alloy in an amount in the range of 2 to 90 weight percent.

13. The alloy of claim 1, wherein the total amount of the anhydride functionalized oligomer and the plasticizer is present in an amount of 5 phr to 35 phr based on the amount of the isobutylene-containing elastomer in the alloy.

14. The alloy of claim 1, wherein the oligomer has an anhydride level of 5 to 25 wt %.

15. A dynamically vulcanized alloy comprising the following components:
   a) at least one isobutylene-containing elastomer;
   b) at least one polar thermoplastic resin,
   c) an anhydride functionalized oligomer wherein the oligomer has a molecular weight, prior to functionalization, in the range of 750 to 1250 and the anhydride functionality is grafted to the polar thermoplastic resin, and
   d) a plasticizer, the plasticizer comprising a component selected from the group consisting of tertiary amines, secondary diamines, and sulfonamides,
wherein the total amount of anhydride functionalized oligomer and the plasticizer is present in an amount of 5 phr to 35 phr based on the amount of the isobutylene-containing elastomer in the alloy, and the anhydride functionalized oligomer and the plasticizer are present in a ratio ranging from 0.15 to 3.0, and wherein the elastomer is present as a dispersed phase of small vulcanized or partially vulcanized particles in a continuous phase of the thermoplastic resin.

16. The alloy of claim 15 wherein the elastomer is present in the alloy in an amount in the range of 2 to 90 weight percent.

17. The alloy of claim 15 wherein the anhydride functionality is either a succinic anhydride or a maleic anhydride and the oligomer is selected from the group consisting of an alkyl, an aryl, and an alkenyl oligomer.

* * * * *